(12) United States Patent
Moerder

(10) Patent No.: US 6,674,730 B1
(45) Date of Patent: Jan. 6, 2004

(54) METHOD OF AND APPARATUS FOR TIME SYNCHRONIZATION IN A COMMUNICATION SYSTEM

(75) Inventor: Karl E. Moerder, Poway, CA (US)

(73) Assignee: Tachyon, Inc., San Diego, CA (US)

(*) Notice: Subject to any disclaimer, the term of this patent is extended or adjusted under 35 U.S.C. 154(b) by 0 days.

(21) Appl. No.: 09/354,934

(22) Filed: Jul. 15, 1999

Related U.S. Application Data

(60) Provisional application No. 60/095,341, filed on Aug. 4, 1998.

(51) Int. Cl.[7] .............................................. H04B 7/185
(52) U.S. Cl. ...................... 370/316; 370/315; 370/324; 370/312; 370/503; 370/508; 370/509; 455/13.2; 455/12.1; 455/427; 455/11.1; 455/18; 455/502
(58) Field of Search ................................ 370/316, 315, 370/324, 312, 503, 508, 509, 510, 513, 480, 342, 343; 375/364, 354, 356, 362; 455/13.2, 12.1, 427, 67.6, 502, 503, 11.1, 18

(56) References Cited

U.S. PATENT DOCUMENTS

| | | |
|---|---|---|
| 3,611,435 A | 10/1971 | Cooper |
| 3,818,453 A | 6/1974 | Schmidt et al. |
| 4,218,654 A | 8/1980 | Ogawa et al. |
| 4,543,574 A | 9/1985 | Takagi et al. |
| 4,545,061 A | 10/1985 | Hileman |
| 4,555,782 A | 11/1985 | Alaria et al. |
| 4,689,787 A | 8/1987 | Hotta |
| 4,736,371 A | 4/1988 | Tejima et al. |
| 4,763,325 A | 8/1988 | Wolfe et al. |
| 4,774,707 A | 9/1988 | Raychaudhuri |
| 4,800,560 A | 1/1989 | Aoki et al. |
| 4,811,200 A | 3/1989 | Wagner et al. |

(List continued on next page.)

FOREIGN PATENT DOCUMENTS

| | | |
|---|---|---|
| EP | 0 026 603 | 4/1981 |
| EP | 0 097 309 | 1/1984 |
| EP | 0 584 820 A1 | 3/1994 |
| EP | 0 722 228 A2 | 7/1996 |
| EP | 0 755 164 A2 | 1/1997 |
| EP | 0 779 717 A2 | 6/1997 |
| EP | 0 889 660 A2 | 1/1999 |
| EP | 0 889 664 A2 | 1/1999 |
| EP | 0 901 253 A2 | 3/1999 |
| EP | 0 912 015 A2 | 4/1999 |
| EP | 0 912 016 A2 | 4/1999 |
| EP | 0 913 968 A1 | 5/1999 |

(List continued on next page.)

*Primary Examiner*—Lee Nguyen
*Assistant Examiner*—Marceau Milord
(74) *Attorney, Agent, or Firm*—Knobbe, Martens, Olson & Bear, LLP

(57) ABSTRACT

Time alignment of a signal from a remote unit at a hub station of a multiple access system is achieved based upon an initial time indication received from the hub station at the remote unit via a satellite. The remote unit transmits a signal to the satellite, monitors for a retransmission of the signal from the satellite and measures the time difference between the outgoing and incoming signals. The remote unit, then, uses the time difference to more finely adjust the time alignment. Alternatively, the remote unit transmits a first signal advanced with respect to an on-time estimate to the hub station and receives a responsive energy indication from the hub station. The remote unit transmits a second signal delayed with respect to the on-time estimate to the hub station and receives a responsive energy indication from the hub station. The remote unit compares the two energy indications and adjusts the on-time estimate. In another embodiment, the remote unit receives a compensated time indication from the hub station. The remote unit compares the time indication with the time at which the indication was actually received based upon a local, accurate time reference. The remote unit sets a transmission timer equal to the current time indicated by the local reference advanced by the difference between the time indication and the time which the time indication was received.

30 Claims, 7 Drawing Sheets

U.S. PATENT DOCUMENTS

| | | | | |
|---|---|---|---|---|
| 4,837,786 | A | 6/1989 | Gurantz et al. | |
| 4,841,527 | A | 6/1989 | Raychaudhuri et al. | |
| 4,868,795 | A | 9/1989 | McDavid et al. | |
| 5,012,469 | A | 4/1991 | Sardana | |
| 5,072,445 | A * | 12/1991 | Nawata | 370/104.1 |
| 5,121,387 | A | 6/1992 | Gerhardt et al. | |
| 5,159,592 | A | 10/1992 | Perkins | |
| 5,166,929 | A | 11/1992 | Lo | |
| 5,172,375 | A | 12/1992 | Kou | |
| 5,216,427 | A | 6/1993 | Yan et al. | |
| 5,239,677 | A | 8/1993 | Jasinski | |
| 5,276,703 | A | 1/1994 | Budin et al. | |
| 5,297,144 | A | 3/1994 | Gilbert et al. | |
| 5,345,583 | A | 9/1994 | Davis | |
| 5,381,443 | A | 1/1995 | Borth et al. | |
| 5,384,777 | A | 1/1995 | Ahmadi et al. | |
| 5,420,864 | A | 5/1995 | Dahlin et al. | |
| 5,471,473 | A | 11/1995 | Tejima | |
| 5,481,258 | A | 1/1996 | Fawcett et al. | |
| 5,485,464 | A | 1/1996 | Strodtbeck et al. | |
| 5,490,087 | A | 2/1996 | Redden et al. | |
| 5,537,397 | A | 7/1996 | Abramson | |
| 5,539,730 | A | 7/1996 | Dent | |
| 5,541,924 | A | 7/1996 | Tran et al. | |
| 5,550,992 | A | 8/1996 | Hashimoto | |
| 5,566,168 | A | 10/1996 | Dent | |
| 5,570,355 | A | 10/1996 | Dail et al. | |
| 5,577,024 | A | 11/1996 | Malkamaki et al. | |
| 5,586,121 | A | 12/1996 | Moura et al. | |
| 5,612,703 | A | 3/1997 | Mallinckrodt | |
| 5,613,195 | A | 3/1997 | Ooi | |
| 5,615,212 | A | 3/1997 | Ruszczyk et al. | |
| 5,638,361 | A | 6/1997 | Ohlson et al. | |
| 5,642,354 | A | 6/1997 | Spear | |
| 5,644,576 | A | 7/1997 | Bauchot et al. | |
| 5,651,009 | A | 7/1997 | Perreault et al. | |
| 5,652,892 | A | 7/1997 | Ugajin | |
| 5,673,322 | A | 9/1997 | Pepe et al. | |
| 5,677,909 | A | 10/1997 | Heide | |
| 5,678,208 | A | 10/1997 | Kowalewski et al. | |
| 5,694,434 | A * | 12/1997 | Burke | 375/340 |
| 5,696,903 | A | 12/1997 | Mahany | |
| 5,704,038 | A | 12/1997 | Mueller et al. | |
| 5,706,278 | A | 1/1998 | Robillard et al. | |
| 5,732,328 | A | 3/1998 | Mitra et al. | |
| 5,734,833 | A | 3/1998 | Chiu et al. | |
| 5,745,485 | A | 4/1998 | Abramson | |
| 5,758,088 | A | 5/1998 | Bezaire et al. | |
| 5,768,254 | A | 6/1998 | Papadopoulos et al. | |
| 5,790,533 | A | 8/1998 | Burke et al. | |
| 5,790,535 | A | 8/1998 | Kou | |
| 5,790,551 | A | 8/1998 | Chan | |
| 5,790,939 | A | 8/1998 | Malcolm et al. | |
| 5,790,940 | A | 8/1998 | Laborde et al. | |
| 5,793,772 | A * | 8/1998 | Burke et al. | 370/508 |
| 5,796,726 | A | 8/1998 | Hassan et al. | |
| 5,802,061 | A | 9/1998 | Agarwal | |
| 5,809,093 | A | 9/1998 | Cooper | |
| 5,809,400 | A | 9/1998 | Abramsky et al. | |
| 5,809,414 | A | 9/1998 | Coverdale et al. | |
| 5,815,652 | A | 9/1998 | Ote et al. | |
| 5,815,798 | A | 9/1998 | Bhagalia et al. | |
| 5,818,831 | A | 10/1998 | Otonari | |
| 5,818,845 | A | 10/1998 | Moura et al. | |
| 5,818,887 | A | 10/1998 | Sexton et al. | |
| 5,822,311 | A | 10/1998 | Hassan et al. | |
| 5,828,655 | A | 10/1998 | Moura et al. | |
| 5,848,064 | A | 12/1998 | Cowan | |
| 5,859,852 | A | 1/1999 | Moura et al. | |
| 5,862,452 | A | 1/1999 | Cudak et al. | |
| 5,872,820 | A | 2/1999 | Upadrasta | |
| 5,889,766 | A | 3/1999 | Ohnishi et al. | |
| 5,905,719 | A | 5/1999 | Arnold et al. | |
| 5,909,447 | A | 6/1999 | Cox et al. | |
| 5,910,945 | A | 6/1999 | Garrison et al. | |
| 5,915,207 | A | 6/1999 | Dao et al. | |
| 5,926,458 | A | 7/1999 | Yin | |
| 5,946,602 | A | 8/1999 | Sayegh | |
| 5,958,018 | A | 9/1999 | Eng et al. | |
| 5,959,982 | A | 9/1999 | Federkins et al. | |
| 5,960,001 | A | 9/1999 | Shaffer et al. | |
| 5,963,557 | A | 10/1999 | Eng | |
| 5,966,412 | A | 10/1999 | Ramaswamy | |
| 5,966,636 | A | 10/1999 | Corrigan et al. | |
| 6,108,317 | A * | 8/2000 | Jones et al. | 370/320 |
| 6,208,626 | B1 * | 3/2001 | Brewer | 370/324 |
| 6,240,077 | B1 * | 5/2001 | Vuong et al. | 370/330 |
| 6,249,515 | B1 * | 6/2001 | Kim et al. | 370/337 |

FOREIGN PATENT DOCUMENTS

| | | |
|---|---|---|
| EP | 0 913 970 A1 | 5/1999 |
| EP | 0 915 592 A1 | 5/1999 |
| EP | 0 917 317 A1 | 5/1999 |
| EP | 0 920 226 A2 | 6/1999 |
| EP | 0 923 266 | 6/1999 |
| JP | 59 015349 | 1/1984 |
| WO | 94/19530 | 9/1994 |
| WO | 95/34153 | 12/1995 |
| WO | 96/05690 | 2/1996 |
| WO | 96/11535 | 4/1996 |
| WO | 97/11566 | 3/1997 |
| WO | 07/38502 | 10/1997 |
| WO | 97/37457 | 10/1997 |
| WO | 97/47158 | 12/1997 |
| WO | 97/50249 | 12/1997 |
| WO | 98/12829 | 3/1998 |
| WO | 98/12833 | 3/1998 |
| WO | 98/16046 | 4/1998 |
| WO | 98/19466 | 5/1998 |
| WO | 98/20724 | 5/1998 |
| WO | 98/23112 | 5/1998 |
| WO | 98/24250 | 6/1998 |
| WO | 98/37669 | 8/1998 |
| WO | 98/37706 | 8/1998 |
| WO | 98/44747 | 10/1998 |
| WO | 98/47236 | 10/1998 |
| WO | 98/49625 | 11/1998 |
| WO | 98/54858 | 12/1998 |
| WO | 98/54859 | 12/1998 |
| WO | 99/04338 | 1/1999 |
| WO | 99/04508 | 1/1999 |
| WO | 99/04509 | 1/1999 |
| WO | 99/04521 | 1/1999 |
| WO | 99/05828 | 2/1999 |
| WO | 99/13616 | 3/1999 |
| WO | 99/14963 | 3/1999 |
| WO | 99/16201 | 4/1999 |
| WO | 99/19996 | 4/1999 |
| WO | 99/19999 | 4/1999 |
| WO | 99/21287 | 4/1999 |
| WO | 99/21291 | 4/1999 |
| WO | 99/21296 | 4/1999 |
| WO | 99/21328 | 4/1999 |
| WO | 99/21329 | 4/1999 |
| WO | 99/21378 | 4/1999 |
| WO | 99/21381 | 4/1999 |
| WO | 99/22500 | 6/1999 |
| WO | 99/39480 | 8/1999 |

* cited by examiner

METHOD OF AND APPARATUS FOR TIME SYNCHRONIZATION IN A COMMUNICATION SYSTEM

RELATED APPLICATION

This application claims priority under 35 U.S.C. § 119(e) to U.S. Provisional Application No. 60/095,341, entitled METHOD AND APPARATUS FOR TIME SYNCHRONIZATION IN A COMMUNICATION SYSTEM, filed Aug. 4, 1998, which is herein incorporated by reference.

BACKGROUND OF THE INVENTION

I. Field of the Invention

This invention relates generally to communications. More specifically, the invention relates to synchronization in a wireless communication system.

II. Description of the Related Art

The wireless medium is becoming one of the predominate means by which voice information and digital data are transferred in modern society. In wireless communication systems, it is common that a plurality of remote units communicate with a single hub station. In order to combat the harsh wireless environment while providing multiple access to a plurality of remote units, modulation schemes which provide efficient data transfer, as well as user channelization, have been developed. In general, these modulation schemes operate most efficiently when the signal from each remote unit arrives at the hub station with a synchronized timing. For example, in a time division multiple access (TDMA) system, each remote unit is assigned a time slot in which to send its data. If the timing of one remote unit is misaligned with respect to the timing from another remote unit, the transmission from one remote unit may overlap in time the transmission of another, thereby, yielding both transmissions unusable. In a typical code division multiple access (CDMA) system, the remote unit signals are distinguished through the use of nearly orthogonal pseudo random codes. If the transmission from one remote unit becomes misaligned with the transmission from another remote unit, the orthogonal nature of the pseudo random codes is degraded and the signals may significantly interfere with one another. Therefore, in both of these types of systems, it is necessary that the remote units operate synchronously with one another.

Therefore, it is desirable to provide an effective method for synchronizing plurality of remote units communicating with a common hub station.

BRIEF DESCRIPTION OF THE DRAWINGS

The features, objectives, and advantages of the invention will become apparent from the detailed description set forth below when taken in conjunction with the drawings wherein like parts are identified with like reference numeral throughout, and wherein.

DETAILED DESCRIPTION OF THE PREFERRED EMBODIMENTS

In a system in which a plurality of remote units communicate with a common hub station over a satellite link, the delay incurred by the remote unit-to-hub station signals as they traverse the satellite link is a function of the position of the remote unit. Because the remote units may be located throughout a large geographic region, the delay incurred by the remote unit-to-hub station signals is different for the various remote units. Most modulation and multiple access schemes operate most efficiently when the remote unit signals arrive at the hub station with a common time alignment. The invention provides a means and method for aligning the timing of a remote unit-to-hub station signal.

Figure 1:
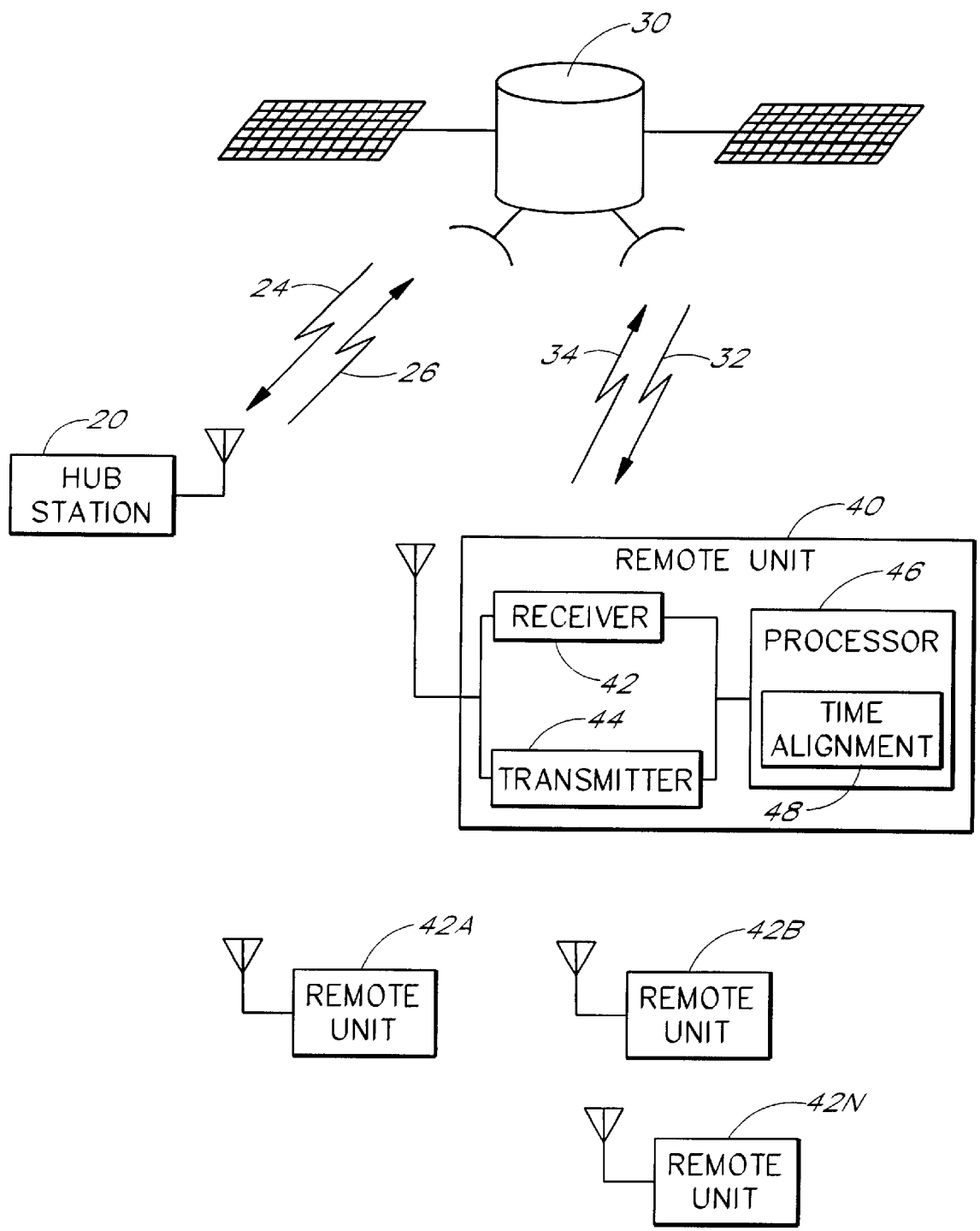
FIG. 1 is a block diagram showing a satellite-based communication system which operates in accordance several embodiments of the invention.

FIG. 1 is a block diagram showing a communication system comprising a wireless satellite link. A hub station 20 transmits hub station-to-remote unit signals to a geosynchronous satellite 30 over a forward uplink channel 26. The satellite 30 receives the hub station-to-remote unit signals on the forward uplink channel 26 and amplifies and retransmits the signals over a forward downlink channel 32, typically at a different frequency than at which they were received.

The hub station-to-remote unit signals transmitted over the forward downlink channel 32 are received by a remote unit 40. A receiver 42 within the remote unit 40 receives and demodulates one or more of the signals on the forward downlink channel 32. The receiver 42 produces digital data bits for a processor 46. The processor 46 also generates reverse link information bits and passes a corresponding data signal to a transmitter 44. The transmitter 44 transmits a corresponding remote unit-to-hub station signal on a reverse uplink channel 34 to the satellite 30 using a time sensitive modulation or channelization technique. The transmitter 44 transmits the signal with reference to a transmission clock. In one embodiment, the transmission clock is generated by a time alignment module 48. The satellite 30 typically amplifies the remote unit-to-hub station signals and retransmits the remote unit-to-hub station signals at a different frequency over a reverse downlink channel 24 to the hub station 20.

The remote unit 40 shares the satellite and hub station resources with a plurality of other remote units 42A–42N. The multiple access scheme by which the remote unit 40 and the remote units 42A–42N share the reverse link channels 24 and 34 operates most efficiently if the remote unit-to-hub station signals arrive at the hub station 20 with a common timing. When the remote unit 40 transmits a signal to the hub station 20 via the satellite 30, the signal experiences a delay of approximately 270 milliseconds. The cumulative forward link and reverse link transmission delay is different for each remote unit and varies as a function of time. Specifically, the transmission delay is a function of the location of the remote unit in relation to the satellite. Typically those remote units which are closest to the satellite experience the lowest transmission delay and those remote units that are furthest from the satellite experience the longest transmission delay. However, other factors may influence the delay. For example, if the remote unit is located within a structure, additional delay may be added into the transmission path. In addition, the satellite is not perfectly stationary relative to the surface of the earth. The transmission delay, thus, varies due to the relative movement of the satellite. For these reasons, even if an initial synchronization between the remote unit 40 and the remote units 42A–42N is achieved, the synchronization may be lost over time if a correction mechanism is not available.

Notice that the delay of the reverse downlink channel 24 is the same for all remote units 40 and 42. Therefore, if the remote unit-to-hub station signals arrive in time synchronization at the satellite 30, they also arrive at the hub station 20 in time synchronization.

Figure 2:
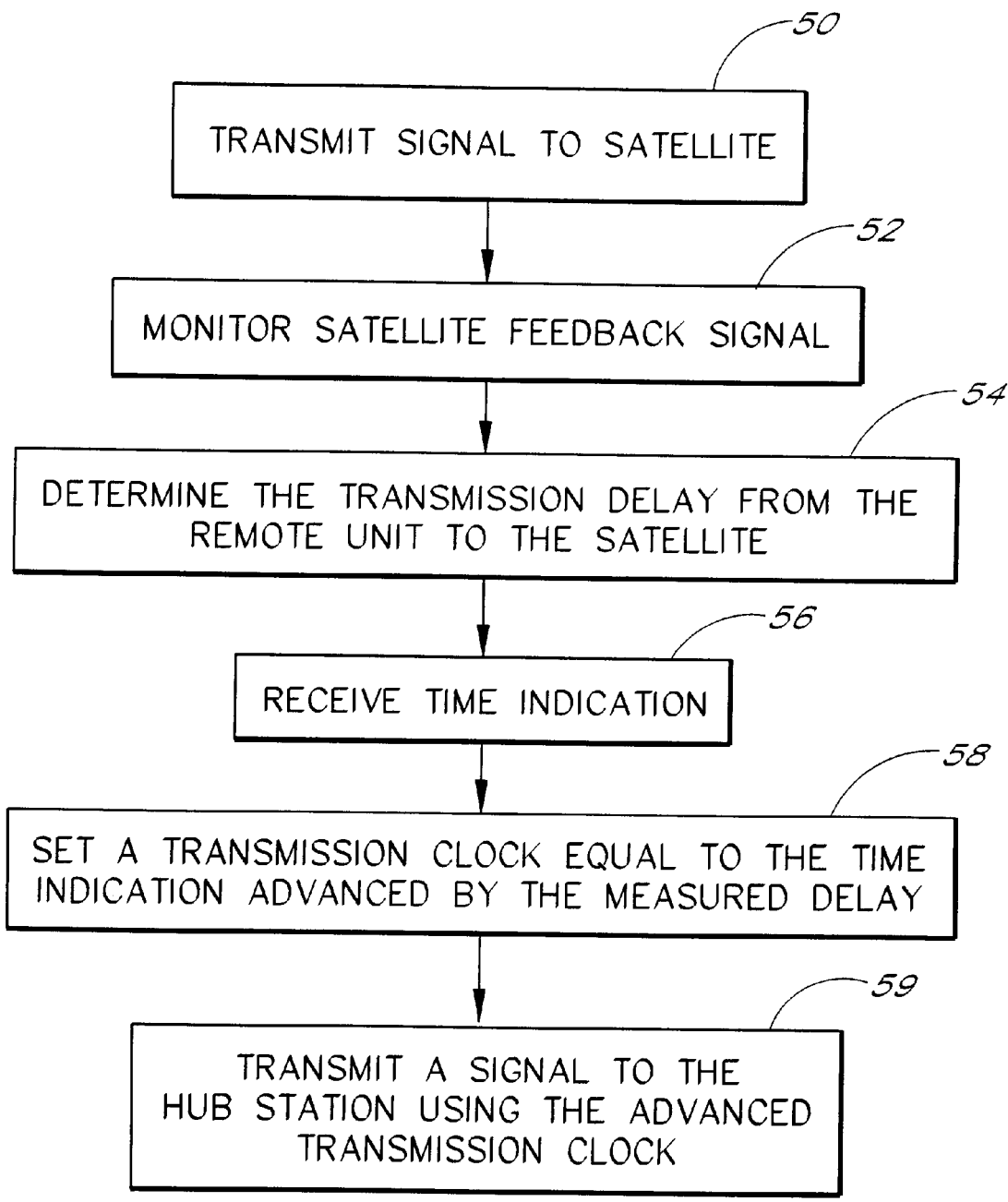
FIG. 2 is a flowchart illustrating time synchronization using a satellite feedback signal.

In one embodiment of the invention, synchronization is initially achieved and periodically updated based upon the remote unit 40 monitoring a feedback signal retransmitted by the satellite 30. The feedback signal is the remote unit's 40 signal transmitted by the satellite 30 over the reverse downlink channel 24. FIG. 2 is a flow chart showing an exemplary embodiment of such a system. Flow begins in block 50 when the remote unit 40 transmits a reverse link signal over the reverse uplink channel 34. Initially, the remote unit 40 uses a time indication received from the hub station 20 over the satellite 30 to determine a first time alignment estimation. The remote unit 40 monitors the reverse downlink channel 24 in order to detect its own transmitted signal in block 52. The reverse downlink channel 24 may operate at a different frequency than the reverse uplink channel 34 or the forward downlink channel 32. For this reason, the remote unit may comprise two receivers. Alternatively, the remote unit may comprise a single receiver which is time multiplexed between the different frequencies, such as the receiver 42 within the remote unit 40 of FIG. 1.

Although the signal level received by the remote unit 40 from the reverse downlink channel 24 may be extremely small, the remote unit 40 can detect it because the remote unit 40 knows the data values which were transmitted which greatly facilitates the detection process according to well known techniques of signal detection based on reception of a signal with known characteristics. In addition, the remote unit 40 can integrate the received power over a relatively long period of time in order to increase the cumulative power received at the remote unit 40. In block 54, the remote unit 40 determines the transmission delay between the remote unit 40 and the satellite 30 by comparing time at which the remote unit 40 transmitted the signal on the reverse uplink channel 34 to the time at which the remote unit 40 received its signal on the reverse downlink channel 24. For example, in FIG. 1, the time alignment module 48 performs these functions.

In order to synchronize the remote units 40 and 42 to a common time, the hub station 20 periodically sends a timing indication according to any one of a myriad of well known techniques. For example, in one embodiment, the hub station 20 transmits a pilot signal. In another embodiment, the hub station 20 transmits a first signal which indicates that an up-coming transmission will signify the occurrence of a pre-determined absolute time. For example, the signal transmitted by the hub station 20 may indicate that at the next forward link data boundary, the time will be exactly 5:02:00.00000 a.m.

Figure 3A:
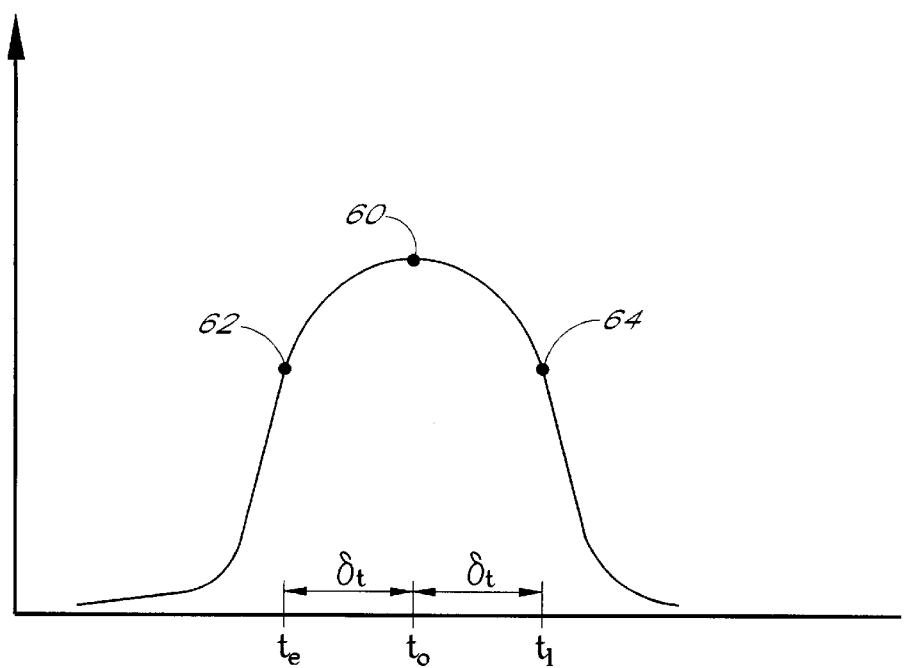
FIG. 3A is a graph showing the energy received at the hub station as a function of the time offset used by the hub station to demodulate a remote unit signal.

In block 56, the remote unit 40 receives the time indication from the hub station 20. When the remote unit 40 receives the indication signal from the hub station 20, the signal has been delayed by the sum of the transmission delay over the forward uplink channel 26 and the forward downlink channel 32. In block 58, the remote unit 40 sets the transmission clock equal to the time indication advanced by the determined transmission delay. In one embodiment, these functions are performed by the time alignment module 48 within the remote unit 40. In block 59, the remote unit 40 uses the time indication adjusted according to the determined transmission delay to transmit its signal to the satellite 30. In this way, each remote unit signal arrives at the satellite 30 having a common timing. The satellite 30 retransmits the time synchronized signals to the hub station 20 where they can be demodulated. Because the delay of the reverse uplink channel 24 is the same for all remote units 40 and 42, the remote unit signals are also synchronized upon arrival at the hub station 20. The embodiment shown in FIG. 2 has the advantage that no changes need to be made to the hub station 20 or the satellite 30 in order to implement such a system if the hub station 20 is already supplying an indication of time In an alternative embodiment, synchronization may be achieved by the transmission of a series of time offset signals from the remote unit 40. FIG. 3A is a graph showing the energy detected at the hub station 20 as a function of the time offset used by the hub station 20 to demodulate a remote unit signal. In FIG. 3A, the vertical axis represents the energy detected by the hub station 20 and the horizontal axis represents the time offset used by the hub station 20 to demodulate the signal. When the hub station 20 demodulates the signal with ideal synchronization at an ideal on-time alignment $t_o$, the hub station 20 detects the maximum energy available from the remote unit signal as shown by data point 60 on FIG. 3A. If the hub station 20 demodulates the remote unit signal using a timing which is delayed by a time offset $\delta_t$ from the ideal on-time alignment $t_o$ to a late time alignment $t_l$, the hub station 20 detects less energy as shown by data point 64 on FIG. 3A. In a like manner, if the hub station 20 demodulates the remote unit signal using a timing which is advanced by the time offset $\delta_t$ from the ideal on-time alignment $t_o$ to an early time alignment $t_e$, the hub station 20 detects less energy as shown by data point 62 in FIG. 3A. So long as the early and late alignments are offset from the on-time alignment by the same amount of time and the on-time alignment is ideal, the energy detected at the early and late alignments is the same.

Figure 3B:
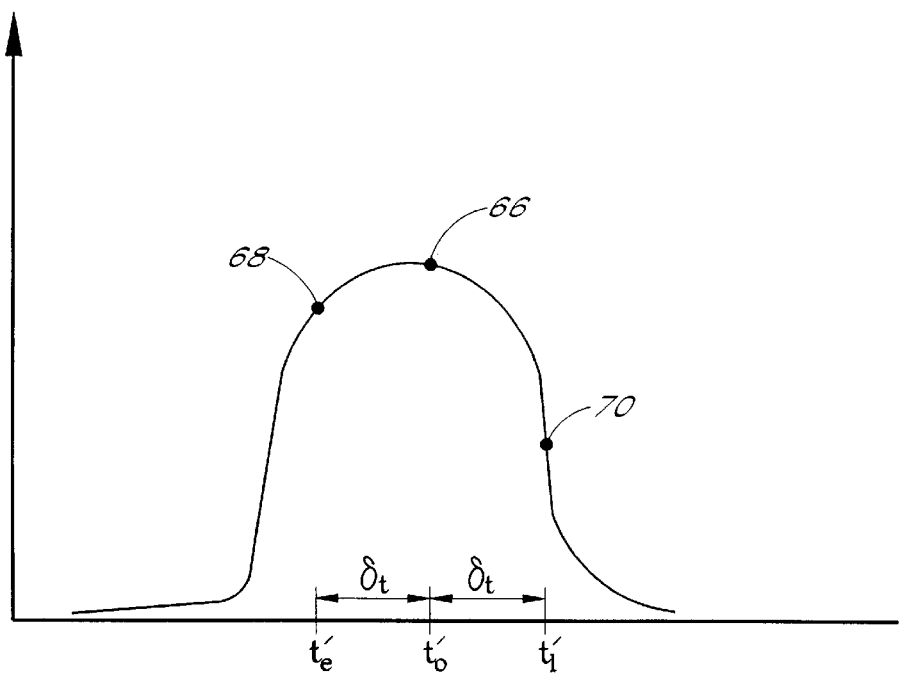
FIG. 3B is a graph showing the energy received at the hub station as a function of the time offset used by the hub station to demodulate a remote unit signal when the on-time alignment is skewed to be slightly late of the ideal timing.

FIG. 3B is a similar diagram to FIG. 3A except that an on-time alignment $t_o'$ has been skewed to be slightly late of the ideal timing. Notice that due to the offset, the amount of energy detected at data point 66 is less than that detected in the ideal case at data point 60. If the hub station 20 demodulates the remote unit signal at time offset $\delta_t$ earlier than the on-time alignment $t_o'$ at the early time alignment $t_e'$ in FIG. 3B as shown by data point 68, the hub station 20 detects more energy than at data points 62 and 64 of FIG. 3A. Likewise, if the hub station 20 demodulates the remote unit signal at an offset delayed by time offset $\delta_t$ from the on-time alignment $t_o'$ at the late time alignment $t_l'$ as shown by data point 70, the hub station 20 detects less energy than at data points 62 and 64 in FIG. 3A and also data point 68 in FIG. 3B. By comparing the energy detected by the hub station 20 at an early time alignment and a late time alignment, it is possible to determine whether the on-time alignment is ideally aligned. If the early and late time alignments yield the same energy level, the hub station 20 is likely to be detecting the signal with an accurate time alignment. If an energy level detected at the early alignment is significantly higher than the energy level detected at the late alignment, the hub station 20 is likely to be detecting the signal with an alignment delayed from the ideal. If an energy level detected at the late alignment is significantly higher than the energy level detected at the early alignment, the hub station 20 is likely to be detecting the signal with an alignment advanced from the ideal.

In one embodiment, the remote units and the hub station collectively implement a time alignment adjustment process using those principals illustrated in FIGS. 3A and 3B. According to the embodiment, the remote unit 40 sends a delayed and an advanced signal to the hub station 20. The hub station 20 detects the two offset signals using a common time alignment. The hub station 20 measures the energy, power level or other signal quality indication of the signal received at each offset and notifies the remote unit 70. Based upon the value of the detected signal quality, the remote unit 40 determines whether the current on-time alignment should be advanced or retarded. Alternatively, the hub station 20 may perform the comparison of the signal quality and return an advance or retard command.

Figure 4:
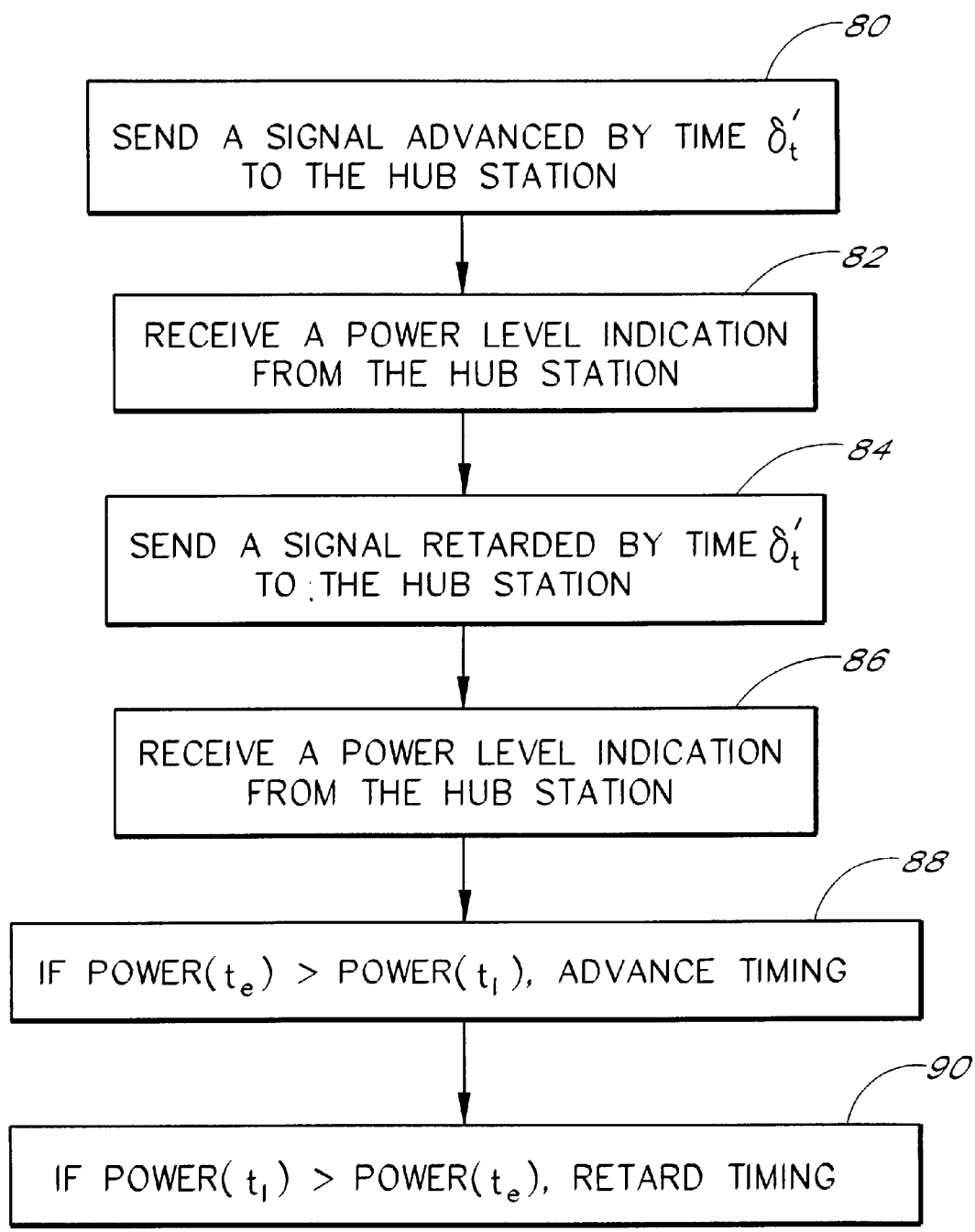
FIG. 4 is a flowchart showing remote unit operation in a system using transmissions offset in time to determine time alignment of a remote unit.

FIG. 4 is a flow chart illustrating the steps performed by the remote unit 40 to implement the time alignment adjustment process just described. In block 80, the remote unit 40 sends a signal to the hub station 20 advanced from a current on-time indication by a time offset $\delta_t'$. In response to receipt of the signal, the hub station 20 sends the remote unit 40 an indication of the signal quality at which the signal was received. For example, the hub station 20 may send a power adjustment command, a relative power or energy measurement, or an absolute power or energy measurement value. In block 82, the remote unit 40 receives the signal quality indication from the hub station 20. In block 84, the remote unit 40 sends a signal retarded from a current on-time indication by time offset $\delta_t'$ to the hub station 20. Once again, the hub station 20 responds by sending the remote unit 40 an indication of the signal quality at which the signal is received. In block 86, the remote unit 40 receives the signal quality indication from the hub station 20. In block 88, if the signal quality received by the hub station 20 corresponding to the early time offset is better than the signal quality received by the hub station 20 at the late time offset, the remote unit 40 advances the current on-time indication. In block 90, if the signal quality received by the hub station 20 at the late time offset is better than the signal quality received at the hub station 20 at the early time offset, the remote unit 40 retards the current on-time indication.

The signal transmitted by the remote unit 40 at the early and late time offsets may be a signal that carries user data to the hub station 20. Alternatively, the signal may be a special overhead or dummy signal which carries no user data. In yet another embodiment, the early and late signals may be transmitted on a different channel than the user data. For example, in a TDMA system, the time alignment may be tested using a different time slot than the one used for the data. In a CDMA system, the timing signals may be transmitted using a different code or offset than the user data signals.

Figure 5:
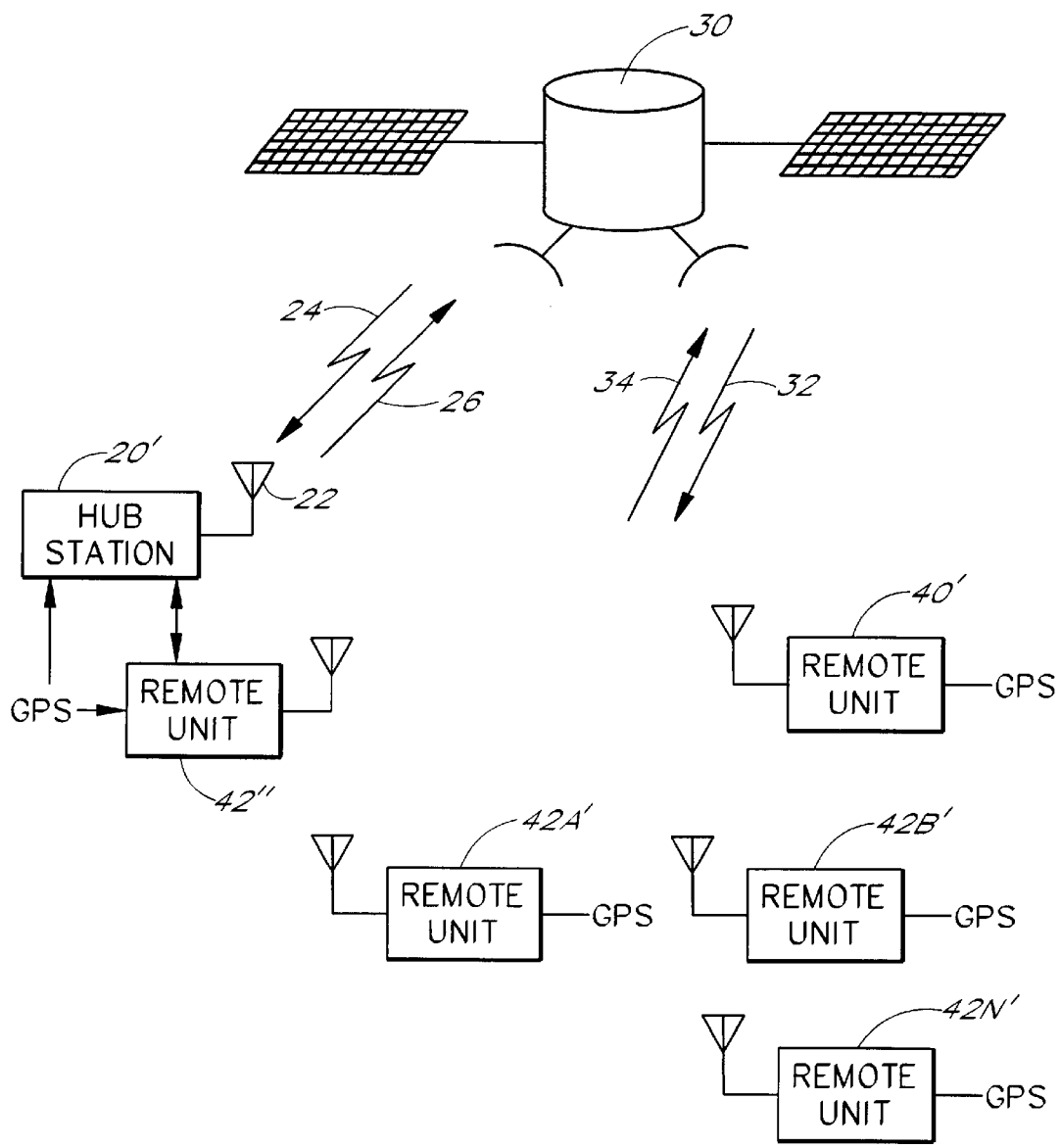
FIG. 5 is a block diagram illustrating a wireless system incorporating time synchronization using a global positioning system (GPS) reference.

FIG. 5 is a block diagram illustrating time synchronization using a global positioning system (GPS) reference. In the system shown in FIG. 5, the hub station 20' and each remote unit 40' and 42' has access to a GPS reference (such as generated by a commercially available GPS receiver) which supplies an extremely accurate indication of current time. The hub station 20' periodically sends a time indication signal based upon the timing signal produced by the GPS reference. In one embodiment, for example, the hub station 20' transmits a first signal which indicates that a future time tag transmission will signify an occurrence of a predetermined absolute time $T_{tag}$. The hub station 20' sends the time tag transmission in advance of the actual occurrence of the tag time in an attempt to compensate for forward link transmission delays. The amount by which the time tag transmission is advanced is the current forward link delay estimate.

The hub station 20' is coupled to a local remote unit 42". The remote unit 42" receives the time tag transmission at time $t_{cal}$ over the forward downlink channel 32. The remote unit 42" uses a GPS reference to determine the value of time $t_{cal}$. The remote unit 42" may also receive a priori knowledge from the hub station 20' regarding the data within or other known characteristic of the transmission in order to more efficiently detect the signal.

The time offset between the time of receipt of the time tag transmission $t_{cal}$ and the predetermined absolute time $T_{tag}$ indicates the error in estimating the forward link delay associated with forward link channels 26 and 32 as perceived by the remote unit 42". Based upon this difference, the hub station 20" can increase or decrease the current value of the forward link delay estimate in an attempt to align time $T_{tag}$ to time $t_{cal}$ at the remote unit 42" for future transmissions. In this way, the hub station 20' transmits the time tag transmission offset in time from the actual occurrence of the indicated time $T_{tag}$ by the forward link delay estimate.

In FIG. 5, the time tag transmission is received by the local remote unit 42". In one embodiment, the remote unit 42" may be a scaled-down remote unit which does not comprise all of the functionality of a standard remote unit. The advantage of using a remote unit 42" is that any delay inherently associated with the remote unit 42" is likely to be similar to that exhibited by the remote units 40' and 42', thus, increasing the accuracy of the forward link delay estimation. In another embodiment, the hub station 20' may incorporate a receiver to receive the time tag transmission.

The remote unit 40' receives the time tag transmission from the hub station 20' at time $t_{ru}$. The time offset between the time $t_{ru}$ of receipt of the time tag transmission and the time $T_{tag}$ indication in the message indicates the error in estimating the forward link delay associated with forward link channels 26 and 32 as perceived by the corresponding remote unit 40'. The remote unit 40' compares the time $t_{ru}$ at which the timing indication was received to the time $T_{tag}$ indication in the message. Because the hub station 20' has already compensated for the forward link delay to some degree, the remote unit 40' perceives only that error due to the difference between the forward link path from the satellite 30 to the remote unit 40' and the forward link path from the satellite 30 to the remote unit 42". The remote unit 40' sets a current time equal to the time indication received from the GPS advanced by the twice time offset between $t_{ru}$ and $T_{tag}$ to compensate for both the downlink and uplink delay.

Figure 6:
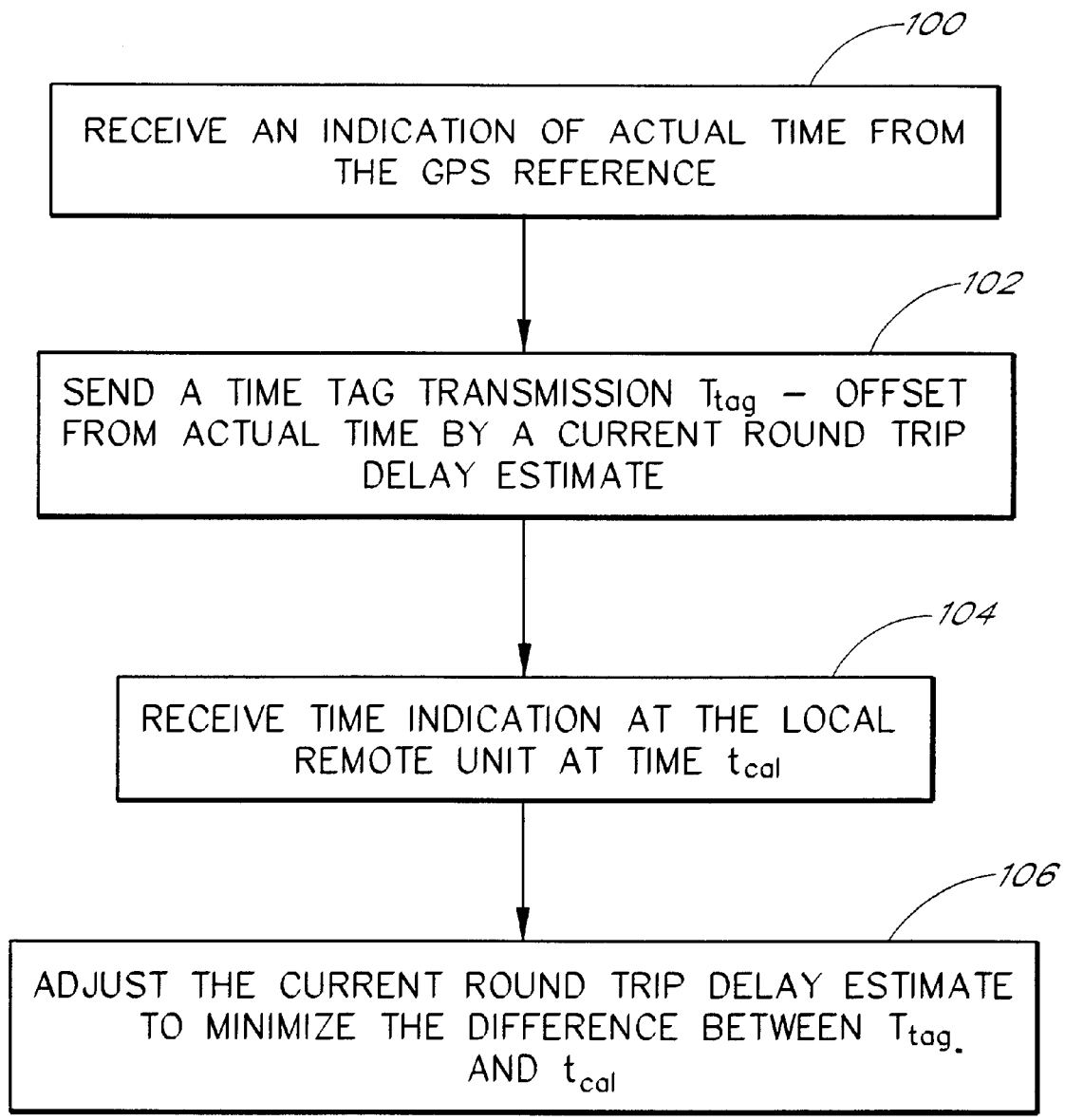
FIG. 6 is a flow chart showing exemplary hub station operation using GPS to achieve synchronization.

FIG. 6 is a flow chart showing exemplary hub station 20' operation, including operation of the local remote unit 42", using a GPS reference. In block 100, the hub station 20' receives an indication of actual time from the GPS reference. In block 102, the hub station 20' transmits a time tag transmission. The hub station 20' transmits the time tag transmission offset from the actual time by a current forward link delay estimate. In block 104, the local remote unit 42" associated with the hub station 20' receives the signal at time $t_{cal}$, determines the value of $t_{cal}$, and passes the value of time $t_{cal}$ to the hub station 20'. The local remote unit 42" can determine the value of time $t_{cal}$ based upon the GPS reference. In block 106, based on the time $t_{cal}$, the hub station 20' changes the time by which the time tag transmission is advanced relative to the actual time in order to minimize the difference between time $t_{cal}$ and time $T_{tag}$ for future transmissions. For example, in one embodiment, the hub station 20' comprises a time alignment module (such as the time alignment module 48 within the remote unit 40 in FIG. 1) which performs the functions of blocks 106.

Figure 7:
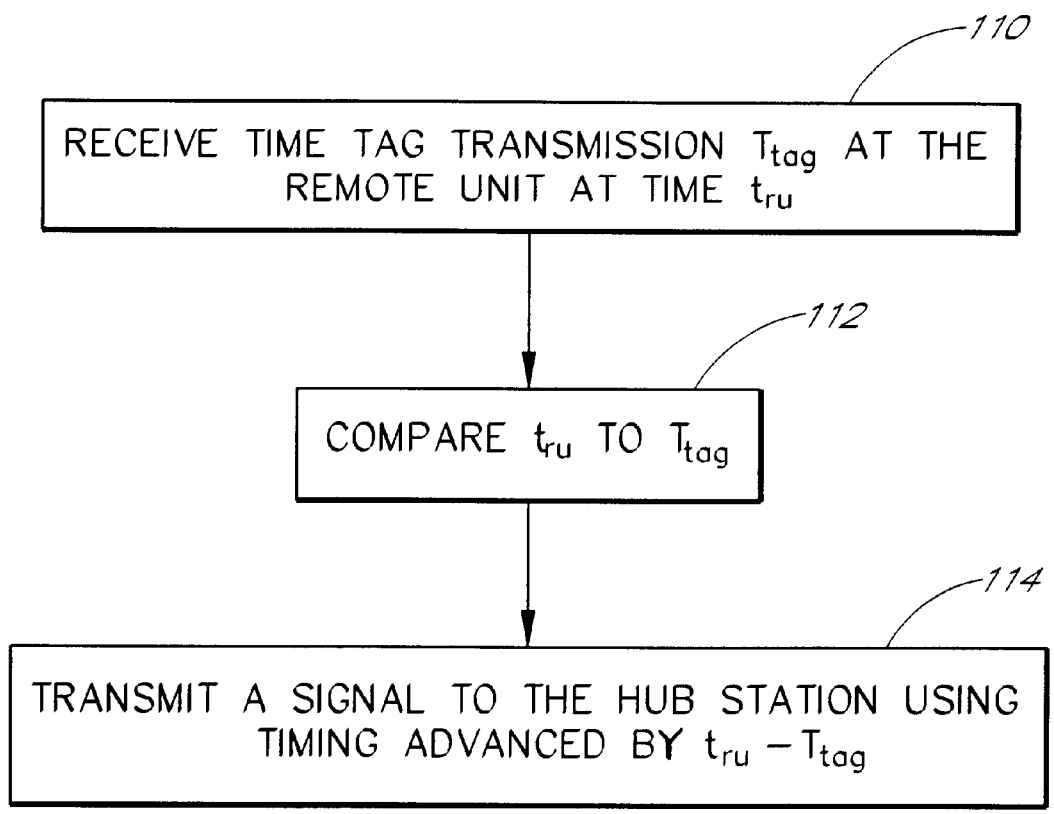
FIG. 7 is a flowchart showing remote unit operation in a system using GPS to achieve synchronization.

FIG. 7 is a flowchart showing remote unit operation in a system using the above-described GPS method. In block 110, the remote unit 40' receives the time tag transmission at time $t_{ru}$. The remote unit 40' can determine the value of time $t_{ru}$ based upon the GPS reference. In block 112, the remote unit 40' compares time $t_{ru}$ to the tag time $T_{tag}$. In block 114, the remote unit 40' transmits a signal with a transmission time equal to the actual time received from the GPS reference advanced by the twice the time offset between time $t_{ru}$ and time $T_{tag}$ to compensate for both the downlink and uplink delay.

Although the invention was described herein with reference to a satellite system, the invention may be embodied in a variety of environments comprising a wireless link including terrestrial based systems. For example, the satellite link may be replaced with a terrestrial repeater. The embodiments disclosed above may be combined with one another.

The invention may be embodied in other specific forms without departing from its spirit or essential characteristics. The described embodiment is to be considered in all respects only as illustrative and not as restrictive and the scope of the claim of the invention is, therefore, indicated by the appended claims rather than by the foregoing descriptions. All changes which come within the meaning and range of equivalency of the claims are to be embraced within their scope.

What is claimed is:

1. A method of time aligning transmissions received from a plurality of remote units at a hub station, the method comprising:
    transmitting a first data signal to a repeater from a first remote unit;
    receiving a copy of said signal as transmitted by said repeater at said first remote unit;
    determining a time difference between transmitting said signal and receiving said copy of said signal; and
    transmitting a second data signal using a timing advanced from a received time by a time increment, wherein said time increment is determined based upon said time difference.

2. The method of claim 1, wherein said received time is received from said hub station over said repeater.

3. The method of claim 1, wherein said first and second data signals are intended for reception by a said hub station.

4. The method of claim 1, wherein said repeater is a satellite.

5. The method of claim 1, wherein receiving said copy occurs at a different frequency than transmitting said first data signal.

6. A method of time aligning transmissions received from a plurality of remote units at a hub station, said method comprising:
    transmitting a first signal from a first remote unit to said hub station, said first signal advanced by time $\delta_t$ with respect to an on-time estimate;
    receiving a responsive advanced signal quality indication at said first remote unit from said hub station;
    sending a second signal from said first remote unit to said hub station, said second signal retarded by time $\delta_t$ with respect to said on-time estimate;
    receiving a responsive retarded signal quality indication at said first remote unit from said hub station; and
    advancing in time said on-time estimate if said responsive advanced signal quality indication indicates a better signal quality than said responsive retarded signal quality indication.

7. The method of claim 6, further comprising retarding in time said on-time estimate if said responsive retarded signal quality indication indicates a better signal quality than said responsive advanced signal quality indication.

8. The method of claim 6, wherein said responsive retarded signal quality indication and said responsive advanced signal quality indication are power level indications.

9. The method of claim 6, wherein said first signal is a data signal.

10. The method of claim 6, wherein said first signal is an overhead signal.

11. A method of time aligning transmissions received from a plurality of remote units at a hub station, said method comprising:
    transmitting a first signal from a first remote unit to said hub station, said first signal advanced by time $\delta_t$ with respect to an on-time estimate;
    determining an advanced signal quality indication at said hub station;
    sending a second signal from said first remote unit to said hub station, said second signal retarded by time $\delta_t$ with respect to said on-time estimate;
    determining a retarded signal quality indication at said hub station; and
    sending a command from said hub station to said remote unit to advance in time said on-time estimate if said advanced signal quality indication indicates a better signal quality than said retarded signal quality indication.

12. A method of time aligning transmissions received from a plurality of remote units at a hub station, said method comprising:
    receiving at a hub station an indication of actual time;
    transmitting a time tag transmission from said hub station to said plurality of remote units via a repeater, said time tag transmission indicating a time equal to said actual time offset by a current time delay estimate;
    receiving a copy of said time tag transmission from said repeater at said hub station;
    adjusting said current time delay estimate based upon the time at which said copy is received; and
    sending a subsequent time tag transmission based upon said adjusted current delay time estimate.

13. The method of claim 12, wherein said repeater is a satellite.

14. The method of claim 12, wherein receiving said copy occurs at a different frequency than transmitting said time tag transmission.

15. The method of claim 12, wherein said receiving said copy is executed by a remote unit associated with said hub station.

16. An remote unit comprising:
    a transmitter configured to transmit a signal to a repeater according to a transmission clock;

a receiver configured to receive a copy of said signal as transmitted by said repeater and configured to receive a time reference; and a time alignment module coupled to said transmitter and said receiver and configured to determine a time difference between transmission of said signal and reception of said copy of said signal and configured to adjust said transmission clock based upon said time difference and said time reference.

17. The remote unit of claim 16, wherein said time reference is received from said hub station over said repeater.

18. The remote unit of claim 16, wherein said signal is intended for reception by a said hub station.

19. The remote unit of claim 16, wherein said repeater is a satellite.

20. A remote unit comprising:

a transmitter configured to transmit a first signal to said hub station, said first signal advanced in time by a time $\delta_t$ with respect to an on-time estimate and configured to transmit a second signal to said hub station, said second signal retarded by a time $\delta_t$ with respect to said on-time estimate;

a receiver configured to receive a responsive advanced signal quality indication from said hub station in response to said first signal and configured to receive a responsive retarded signal quality indication from said hub station in response to said second signal; and a timing module coupled to said transmitter and said receiver and configured to advance in time said on-time estimate if said responsive advanced signal quality indicates a higher signal quality than said responsive retarded signal quality.

21. The remote unit of claim 20, wherein said timing module is further configured to retard in time said on-time estimate if said responsive retarded signal quality indication indicates a higher signal quality than said responsive advanced signal quality indication.

22. The remote unit of claim 20, wherein said first signal is a data signal.

23. The remote unit of claim 20, wherein said first signal is an overhead signal.

24. A hub station, comprising:

a receiver configured to receive an indication of actual time;

a transmitter configured to transmit a time tag transmission to said plurality of remote units via a repeater, said time tag transmission indicating a time equal said actual time offset by a current time delay estimate;

a receiver configured to receive a copy of said time tag transmission from said repeater; and a time adjustment module coupled to said receiver, configured to receive said copy and configured to adjust said current time delay estimate based upon the time at which said copy is received;

wherein said transmitter is further configured to send a subsequent time tag transmission based upon said adjusted current delay time estimate.

25. The hub station of claim 24, wherein said repeater is a satellite.

26. The hub station of claim 24, wherein said receiver configured to receive said copy is located within a remote unit associated with said hub station.

27. An apparatus for time aligning transmissions received from a plurality of remote units at a hub station comprising:

means for transmitting a first data signal to a repeater from a first remote unit;

means for receiving a copy of said signal as transmitted by said repeater at said first remote unit;

means for determining a time difference between transmitting said signal and receiving said copy of said signal; and means for transmitting a second data signal using a timing advanced from a received time by a time increment, wherein said time increment is determined based upon said time difference.

28. An apparatus for time aligning transmissions received from a plurality of remote units at a hub station comprising:

means for transmitting a first signal from a first remote unit to said hub station, said first signal advanced by time $\delta_t$ with respect to an on-time estimate;

means for receiving a responsive advanced signal quality indication at said first remote unit from said hub station;

means for sending a second signal from said first remote unit to said hub station, said second signal retarded by time $\delta_t$ with respect to said on-time estimate;

means for receiving a responsive retarded signal quality indication at said first remote unit from said hub station; and means for advancing in time said on-time estimate if said responsive advanced signal quality indication indicates a better signal quality than said responsive retarded signal quality indication.

29. A apparatus for time aligning transmissions received from a plurality of remote units at a hub station comprising:

means for transmitting a first signal from a first remote unit to said hub station, said first signal advanced by time $\delta_t$ with respect to an on-time estimate;

means for determining an advanced signal quality indication at said hub station;

means for sending a second signal from said first remote unit to said hub station, said second signal retarded by time $\delta_t$ with respect to said on-time estimate;

means for determining a retarded signal quality indication at said hub station; and means for sending a command from said hub station to said remote unit to advance in time said on-time estimate if said advanced signal quality indication indicates a better signal quality than said retarded signal quality indication.

30. A apparatus for time aligning transmissions received from a plurality of remote units at a hub station comprising:

means for receiving at a hub station an indication of actual time;

means for transmitting a time tag transmission from said hub station to said plurality of remote units via a repeater, said time tag transmission indicating a time equal to said actual time offset by a current time delay estimate;

means for receiving a copy of said time tag transmission from said repeater at said hub station;

means for adjusting said current time delay estimate based upon the time at which said copy is received; and means for sending a subsequent time tag transmission based upon said adjusted current delay time estimate.

* * * * *